US005705772A

United States Patent [19]
Brown

[11] Patent Number: 5,705,772
[45] Date of Patent: Jan. 6, 1998

[54] MULTI-SERVICE FLOOR OUTLET

[76] Inventor: Randy J. Brown, 350 Queens Quay West, Apt. 350, Toronto, On., Canada, M5V 3A7

[21] Appl. No.: 603,071

[22] Filed: Feb. 20, 1996

[51] Int. Cl.$^6$ ............................................. H02G 3/12
[52] U.S. Cl. ............................ 174/48; 52/220.8; 174/50
[58] Field of Search .......................... 174/48, 50, 52.1; 52/220.5, 220.4, 220.8

[56]  References Cited

U.S. PATENT DOCUMENTS

| | | | |
|---|---|---|---|
| 5,362,922 | 11/1994 | Whitehead | 174/48 |
| 5,466,886 | 11/1995 | Lengyel et al. | 174/48 |
| 5,467,565 | 11/1995 | Bowman et al. | 52/220.1 |

Primary Examiner—Kristine L. Kincaid
Assistant Examiner—Joseph Waks
Attorney, Agent, or Firm—D. W. Eggins

[57]  ABSTRACT

A flush-mounted multi-service floor outlet, to provide electrical power and multiple voice/data access jack outlets has a unitary, longitudinally compartmented cylindrical metal housing for location in penetrating relation through a cement floor. The power, voice and data connections are normally routed through the ceiling space of the underlying room and are sealed within conduits that are threaded into a base portion of the metal housing. The outlet housing is dimensioned to achieve a nominal fit within a standard sized hole drilled through the concrete floor, and to provide a minimal diametrical clearance with the drilled hole as to render the installation effectively fireproof. A threaded retaining nut may be used to secure the outlet housing in place. Internal compartment partitions isolate the respective ones of power, voice and data conductors and terminations, the partitions being withdrawable so as to provide effective access and facilitate installation and servicing of the respective services. The slim, substantially planar top face of the outlet fits effectively flush with the usual carpet floor covering.

7 Claims, 4 Drawing Sheets

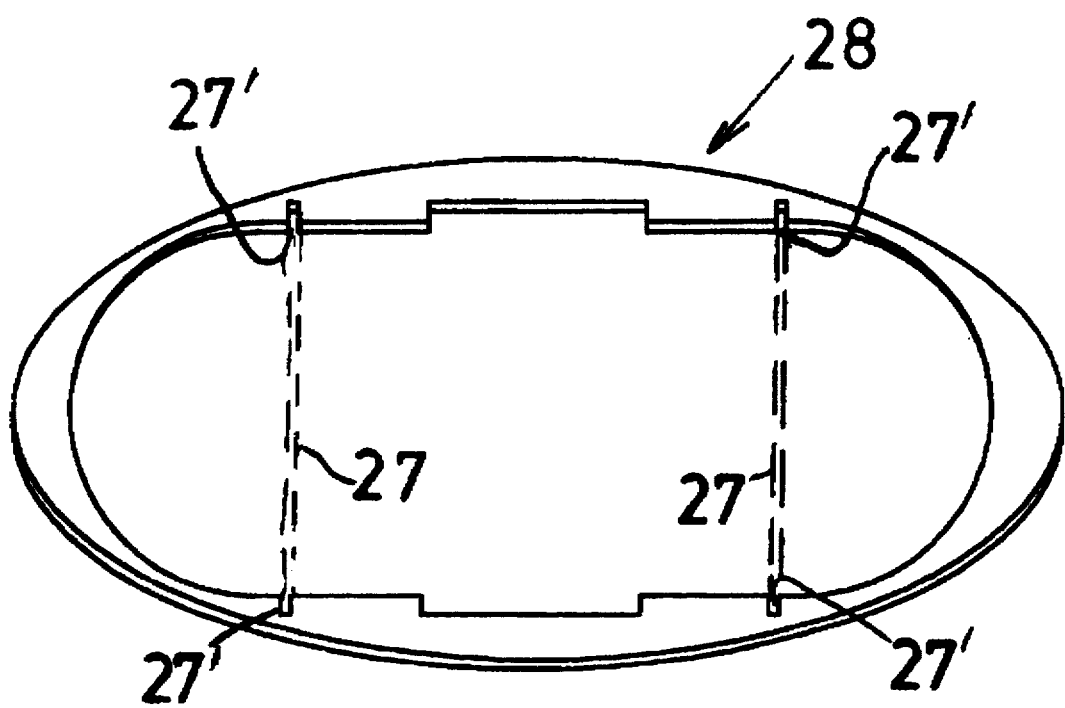

MULTI-SERVICE FLOOR OUTLET

FIELD OF THE INVENTION

This invention is directed to a floor outlet for installation through a concrete floor, to provide electrical power and voice/data jack access.

BACKGROUND OF THE INVENTION

Modern office space is frequently located within high rise buildings having existing concrete floors.

The floor plan for an office is rarely immutable, so that the location of services such as electrical power, voice and data connections requires a high degree of flexibility.

Fire codes frequently require that floor-to-floor interconnection shall be closely restricted, while electrical wiring codes usually require the provision of isolated electrical services.

Many building owners and/or tenants require enclosed electrical and communications wiring in ceiling spaces below. One prior art approach to meet the problems imposed by these strictures has been the use of square, recessable flush outlet housings.

A major drawback with this approach is the need to saw cut an oversized square hole into the concrete floor, and to chisel out to an appropriate depth a recess for housing the outlet. It is then usually necessary to secure the outlet housing in the floor, and to patch, by cementing or grouting the outlet base in place. This can imperil the integrity of the floor, and is usually unacceptable to the structural engineer who is responsible for the building.

In an existing office, adoption of this procedure often causes unintended, highly undesireable local damage to the area carpeting.

Furthermore, the method is labour-intensive, structurally damaging, and makes difficult the succeeding step of installing the associated conduit.

Another prior art approach is to install a through-the-floor outlet, such as the "Walkertap" (trademark), referred to commercially as the "1500 series flush poke-through" having a cylindrical pot that is installed through the floor.

This service outlet, which is nominally "flush", has a doomed top plate above which projects the molded housings of the two voice/data jack outlets.

These voice jack outlets are serviced by pigtail connections that hang down within open recesses below the top plate, and the connections pass outwardly through apertures in the wall of the cylindrical pot, thereby providing a pair of vulnerable paths that require to be packed with fire-proof material, in an attempt to meet the local fire regulation. These pig-tail connections are serviced within the underlying ceiling space, and in the absence of an enclosure and provision for protection such as a conduit, are vulnerable to unauthorized access.

The electrical service occupies the pot, and connects by way of an intermediate conduit with a junction box accessible only in the underlying ceiling space.

Typically, this high-cost installation provides a slightly domed outlet cover having a pair of flush power outlets and a pair of elevated voice/data jacks, which constitute a tripping hazard in open and multi-use areas.

SUMMARY OF THE INVENTION

The present invention provides a unitary, flush mounted, totally enclosed housing for through-floor multi-service installation.

The subject service housing has a substantially planar top flange secured to a cylindrical housing for insertion in close-fitting relation within a cylindrical bore of predetermined standard size.

The housing includes provision for connection of a plurality of service conduits in threaded relation with the lower end of the housing.

The housing includes interior isolating partition means, to enable physical and electrical isolation of an electrical power service therein.

In a preferred embodiment interior partition means are removable, to facilitate manual access to the interior of the housing. A plurality of interior partitions may be provided which are removable, for enhanced manual access.

The partition means may be of fiberglass or other electrical insulating material. Where internal clearances are adequate and no possibility of short-circuiting or undesired capacitance effects exists, and where safety codes are not violated, the use of metal partitions is contemplated.

The subject service housing may have housing securing means, in use to secure the housing in installed relation within an aperture.

The housing securing means may comprise a top flange, and a locknut threadedly attached to the lower exterior portion of the housing, to engage the floor lower surface. The locknut also serves to complete the flameproofing of the installation.

An alternative securing means that is contemplated may comprise a grubscrew or capscrew, the point of which extends outwardly from within the housing, in use to engage the interior of the bore within which the housing is inserted to hold the housing secured therein.

The subject service may include removable cap means, to provide access from above to the interior of the housing. The removable cap means may comprise an outer cover, in securing relation with a plurality of plug-accessed electrical connection units.

The removable cap means may include a flange portion of the pot, by means of which the pot is supported in its position by the surrounding floor.

The removable cap means are preferably secured by way of screws that are recessed in flush relation with the respective cover top surface, and engage threaded apertures of the housing.

The housing may include threaded recesses in a lower portion of the housing, to receive conduit connectors in screwed secured relation therein. The conduit connectors, in turn, receive electrical conduit in connecting relation therewith. The housing may include a unitary bottom portion having a plurality of threaded recesses for the aforesaid conduit connectors.

BRIEF DESCRIPTION OF THE DRAWINGS

Certain embodiments of the invention are described by way of illustration, without limitation of the invention thereto, other than as set forth in the accompanying claims, reference being made to the accompanying drawings, wherein:

FIG. 4 is an enlarged view of a component portion of FIG. 3.

DETAILED DESCRIPTION OF THE INVENTION

Figure 1:
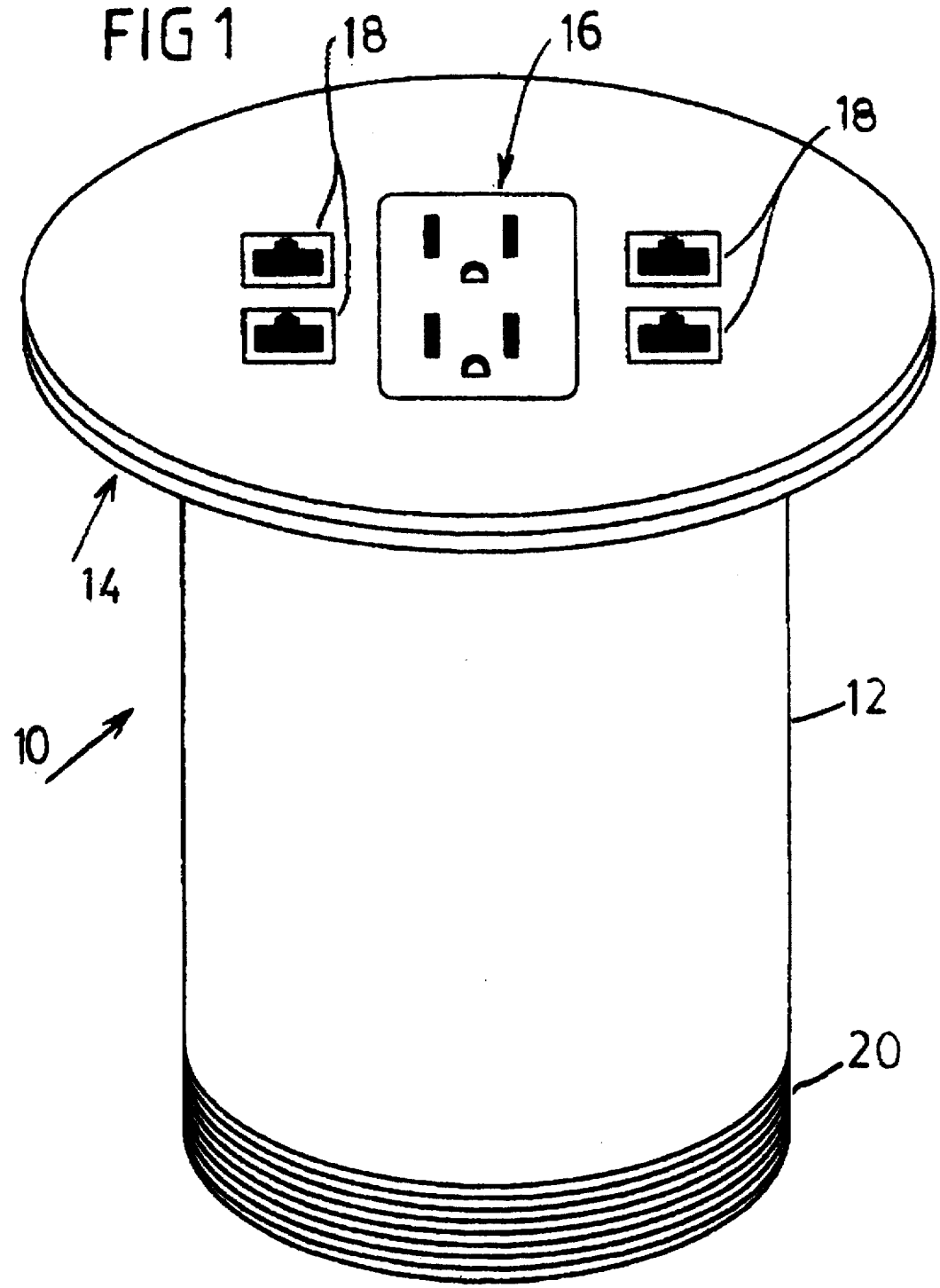
FIG. 1 is a front-and-top perspective view of a housing according to the present invention, complete with a plurality of power and voice/data receptacles.

Referring to FIG. 1, the multi-service floor outlet 10 according to the present invention comprises a cylindrical barrel portion 12 of fireproof material, preferably aluminum for weight and handling considerations.

A flanged cap portion 14 secures a duplex power outlet 16 and four Category 5 voice/data jacks 18.

The outer portion 20 of the bottom of barrel portion 12 is threaded.

Figure 2:
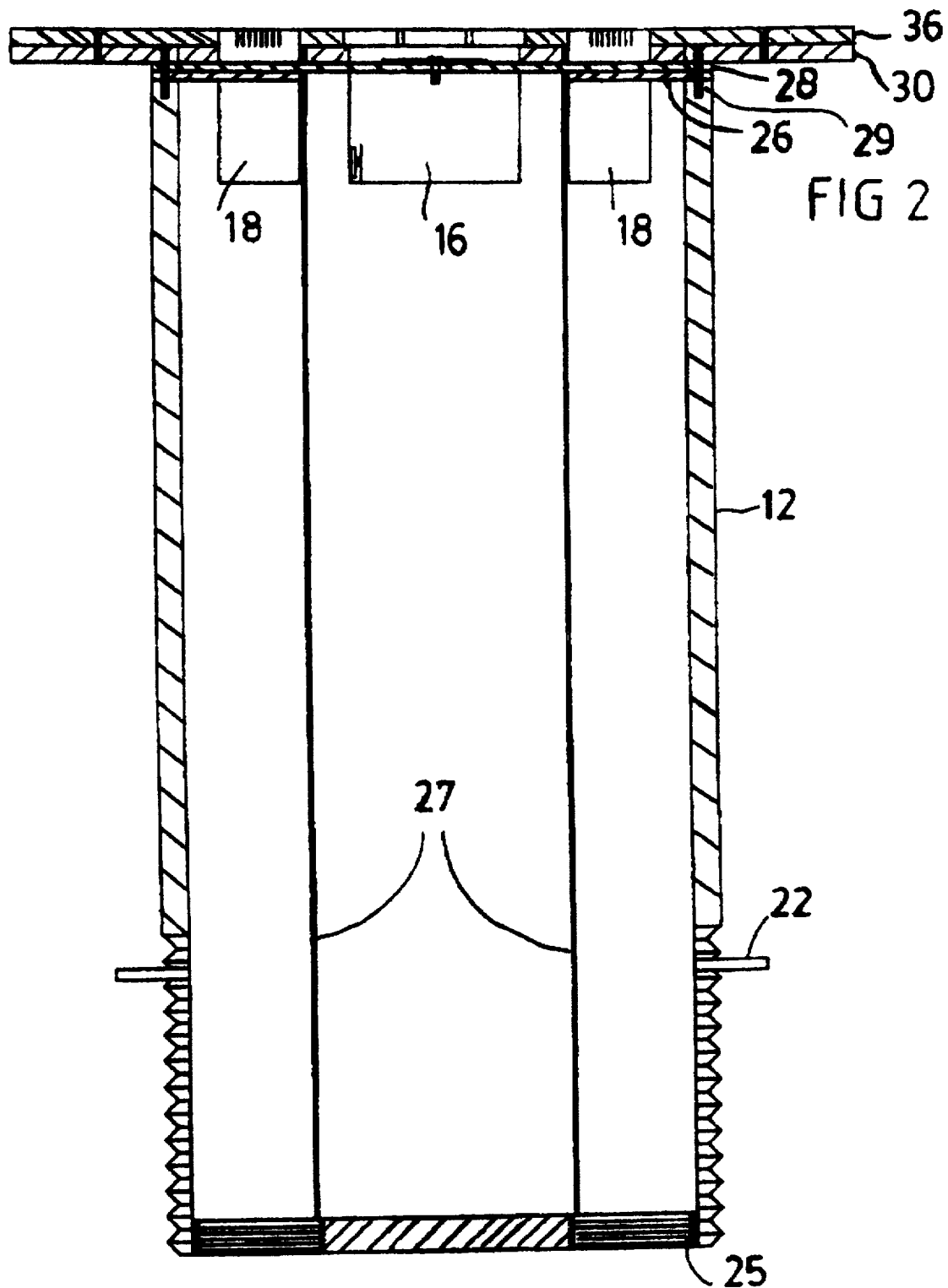
FIG. 2 is a side view of the subject housing, in diametrical section.
Figure 3:
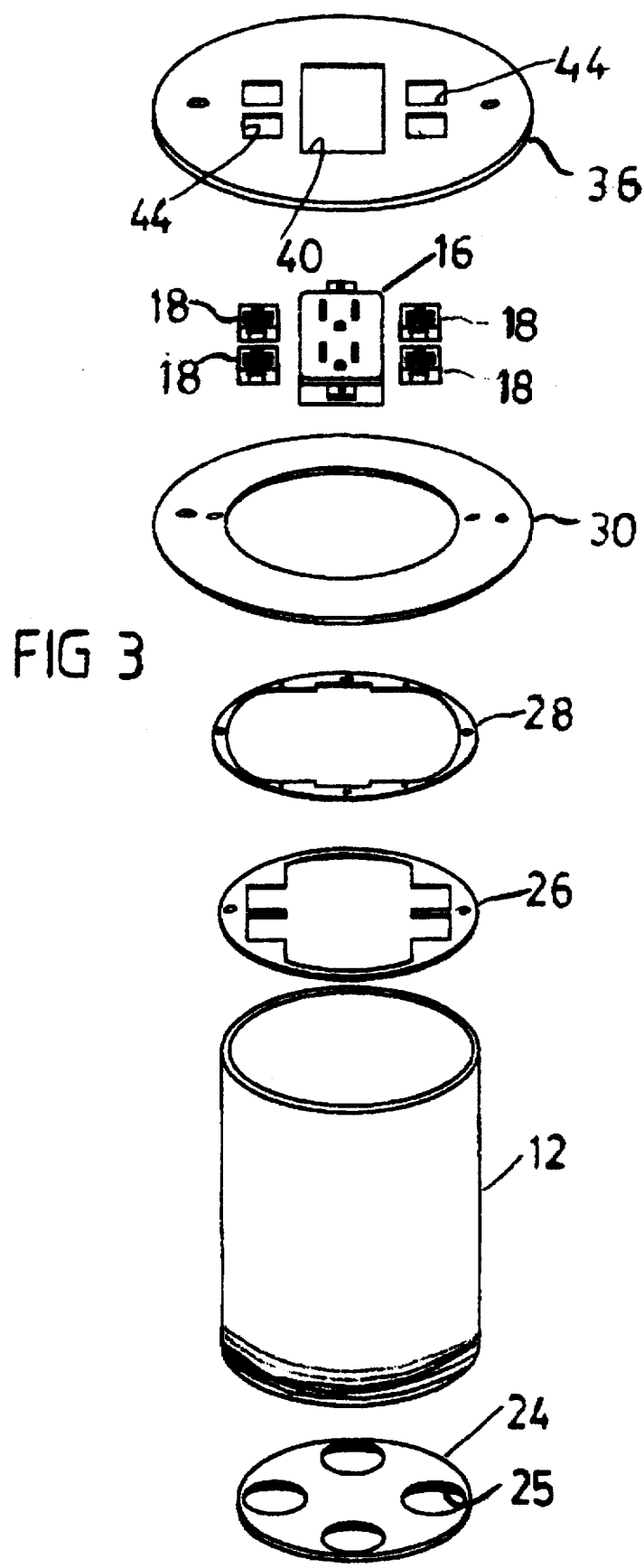
FIG. 3 is an exploded view, in perspective, showing the major components of the FIG. 1 embodiment in exploded relation.

Referring to FIGS. 2 and 3, a removable nut 22 is mounted upon the threaded portion 20.

A bottom closure plate 24 is shown, preferably secured by welding to the barrel portion 12. The plate 24 is illustrated as having four threaded apertures 25 therein, to receive electrical conduit elbows (not shown), secured in screwed relation therein.

Removable partition means 27 having opposed plate portions provide segregated wiring paths, primarily for the conductors for the duplex power outlet 16.

The slender flanged cap portion 14 may be installed so as to sit upon the concrete floor, the top of the outlet 10 being then substantially flush with the surface of the surrounding carpet (not shown).

The cap portion 14 includes a circular plate 26 having offset rectangular recesses to locate voice/data jacks 18. An overlying plate 28 serves to locate the duplex power outlet 16.

The plate 28 has two pairs of slots 27', by which partitions 27 may be inserted in positioned, secured relation.

The cap portion 14 includes a first flange plate 30, which encircles the power outlet 16 and jacks 18 and is secured by screws 29 to the upper rim of barrel portion 12.

A second flange portion of cap portion 14, plate 36, serves as a closure plate and is secured by screws to the first flange plate 30. The plate 36 has recesses 40, 44 in which the dual head portions of the power outlet 16, and the four jacks 18 are accommodated in flush relation.

In use the outlet 10 is installed within a core-drilled through-hole, in close-fitting relation therein, being secured and effectively sealed in place by way of the flanges of cap portion 14, and the nut 22.

The partition means 27 may be removed during installation to facilitate the introduction of the respective wiring (not shown).

It will be understood that certain changes and modifications of the presently disclosed embodiments may be made without departing from the ambit of the present invention, as set forth in the accompanying claims.

COMMERICAL UTILIZATION

There is a widespead market, both in North America and elsewhere, in high-rise concrete buildings, to safely accommodate the wiring needs of modern telecommunications and electronics, along with power supplies, while maintaining required standards against flame penetration.

What I claim by letters patent of the United States is:

1. A fire-resistant multi-service outlet for mounting in a bore of predetermined standard size drilled through an existing concrete floor, to minimize structural damage to the floor, comprising a totally enclosed cylindrical housing having a shallow cover portion in substantial closing relation with the top of the cylindrical housing; said cylindrical housing having an outer diametrical dimension nominally less than said predetermined standard drilled bore; locating means including an upper, radially projecting flange, and a rotatable nut threadedly attached to a lower end portion of said housing, and rotatable thereabouts, to engage an adjacent portion of said concrete floor in sandwiched relation between said upper flange and said nut, to secure said housing in substantially sealed relation with said floor; at least two accesses in the lower portion of the cylindrical housing, to receive an electrical conduit and a further service conduit in attached relation thereto; an electrical outlet and at least one further service outlet secured in substantially flush-mounted relation with said cover portion, said housing fitting in secured, substantially sealing relation within said bore to maintain a fire separation and maintaining said outlets substantially level with said floor.

2. The service outlet as set forth in claim 1, wherein said electrical outlet is a power outlet.

3. The service outlet as set forth in claim 1, said lower portion having a plurality of said accesses; said cover portion having a plurality of additional electrical outlets; and partition means within said housing to provide at least one isolated path between a first one of said lower accesses and a first one of said electrical outlets.

4. The service outlet as set forth in claim 3, said partition means being withdrawable from said housing, in use to facilitate the installation of electrical wiring between said first access and said first electrical outlet.

5. The service outlet as set forth in claim 4, said partition means comprising a plurality of separable partition portions, in use to provide a plurality of individual paths between said lower accesses and respective ones of said electrical outlets.

6. The service outlet as set forth in claim 5, having said electrical outlet and a plurality of voice/data outlets in mutually isolated relation.

7. The service outlet as set forth in claim 3, said partition means being electrically non-conductive.

* * * * *